UNITED STATES PATENT OFFICE.

J. WENISCH, OF TOMPKINSVILLE, AND R. B. BERKY, OF NEW YORK, N. Y.

IMPROVEMENT IN TABLETS.

Specification forming part of Letters Patent No. 32,097, dated April 16, 1861.

*To all whom it may concern:*

Be it known that we, JOHN WENISCH, of Tompkinsville, in the county of Richmond and State of New York, and REESE B. BERKY, of the city, county, and State of New York, have invented a new and useful Improvement in Tablets to Serve the Purpose of Writing-Slates and Blackboards; and we do hereby declare that the following is a full, clear, and exact description of the same.

Our invention consists in the manufacture of tablets by coating paper, pasteboard, sheet metal, or wood, or other suitable substance, first with a composition of plaster-of-paris, white lead, and gum-arabic or glue reduced with water to a sufficiently plastic state to be spread easily, and afterward with a composition of shellac, emery, lamp-black, or ivory-black reduced by alcohol to a suitable consistency to be used as paint with a brush; or, instead of coating a piece of paper, pasteboard, wood, or metal with the priming composition, we make a sheet or slab of that composition and apply the finishing composition upon it.

The primary composition is prepared as follows: Take of gum-arabic or refined glue, four (4) ounces; plaster-of-paris, (gypsum,) one and a half (1½) pound; white lead, (carbonate of lead,) in powder, one (1) pound; water, one (1) quart, or similar proportions. Dissolve the gum or glue in the water. Then add gradually and stir in, first, the plaster-of-paris, and afterward the white lead. The composition thus mixed will generally be thin enough to be easily spread over any flat surface; but if it should not be thin enough more water may be added.

If glue is used, it should be boiled in the water and should have the plaster-of-paris and white lead added while it is warm; but if gum is used the composition may, in warm weather, be made at an ordinary temperature, or in cold weather in a warm room. This composition should be quickly spread on one or both sides, as required, of the paper, pasteboard, metal, or wood with a trowel, spatula, or other suitable implement, or with a roller or rollers, and when dry should be rubbed smooth with sand-paper or other smoothing material; or, instead of spreading the composition upon another body, it may be formed into solid slabs by pouring it on a smooth flat plate, and spread or rolled out smooth and even. The slabs thus formed should be dried and rubbed smooth, as before mentioned. In making such slabs glue should be used in preference to gum-arabic, on account of its greater tenacity.

The composition for finishing the tablets is prepared in the following manner: Take of alcohol, one (1) pint; shellac, four (4) ounces; emery, eight (8) ounces; lamp-black or ivory-black, two (2) ounces, or similar proportions. Dissolve the shellac in the alcohol. Then stir in the emery and the lamp-black or ivory-black, and when well mixed apply this composition with a brush to the priming-surface of the priming composition, and when dry the tablet will be fit for use. One, two, or more applications of this finishing composition may be applied, as may be found desirable; but each should be dry before another application is made. The necessity of more than one application may, however, in almost any case be obviated by mixing with the priming composition a small quantity of lamp-black or ivory-black, say about —— ounces to the quantity hereinabove specified. The tablets thus prepared may be framed or used without frames. They are made at small expense, and while they may be written on with any of the various kinds of pencils used for slates they are superior on account of the absence of liability to fracture. This superiority is more especially manifest when the priming composition is spread upon paper, pasteboard, or metal.

We do not confine ourselves strictly to the use of the precise proportions of the several ingredients herein specified for either composition, as such proportions may be varied to some extent without changing their character, but

What we claim as our invention, and desire to secure by Letters Patent, is—

The manufacture of tablets of paper, pasteboard, wood, sheet metal, or other material, coated first with the within-specified priming composition, and afterward with the within-specified finishing composition, or of slabs of such priming composition coated with such finishing composition.

JOHN WENISCH.
REESE B. BERKY.

Witnesses:
M. M. LININGSTON,
J. LAIRD.